March 24, 1959     J. A. MALACHICK     2,878,971
DISPENSER FOR BREAD CRUMBS AND OTHER FOOD Filed Sept. 3, 1957     3 Sheets-Sheet 1

INVENTOR.
JOSEPH A. MALACHICK
BY
ATTORNEY

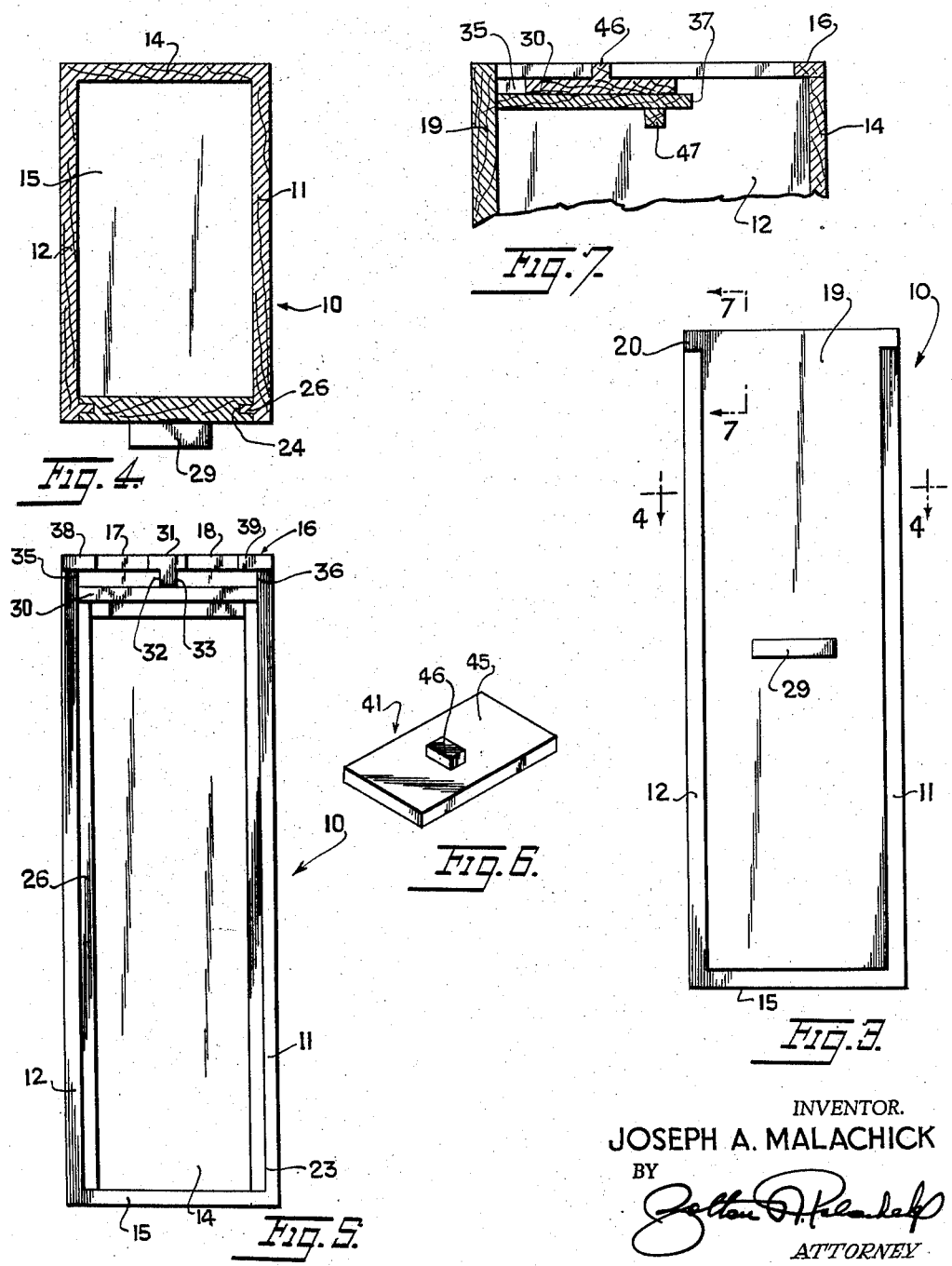

March 24, 1959    J. A. MALACHICK    2,878,971
DISPENSER FOR BREAD CRUMBS AND OTHER FOOD
Filed Sept. 3, 1957    3 Sheets-Sheet 3
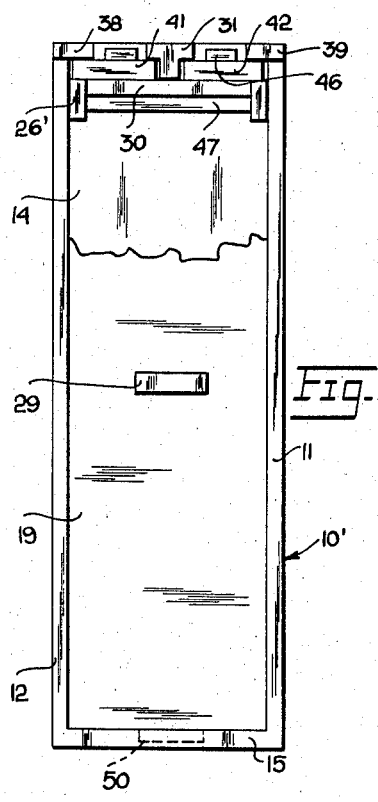
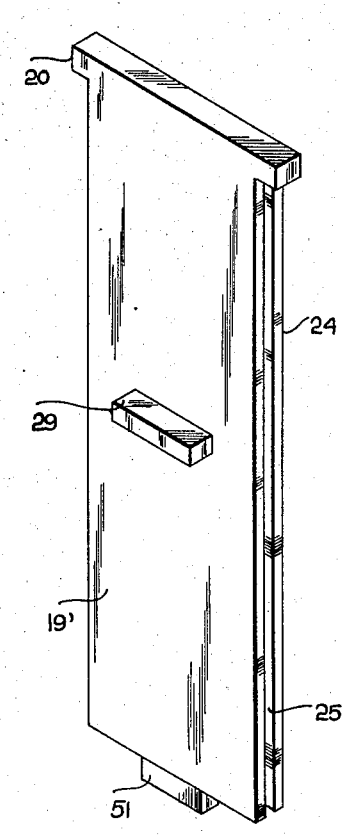
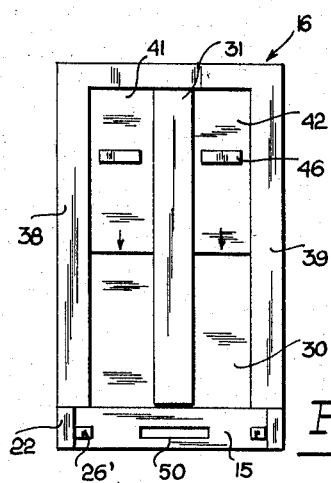
INVENTOR.
JOSEPH A. MALACHICK
BY
ATTORNEY

United States Patent Office 2,878,971
Patented Mar. 24, 1959

2,878,971

DISPENSER FOR BREAD CRUMBS AND OTHER FOOD

Joseph A. Malachick, New York, N.Y.

Application September 3, 1957, Serial No. 681,485

6 Claims. (Cl. 222—183)

This invention concerns a storage and dispensing jacket for containers of baby foods, cereals, powdered soaps, and other granulated materials.

A primary object of the present invention is to provide a jacket for housing a container or containers of granulated material whereby the contents of the container or containers is protected from light, air, dust and vermin in order to keep the contents clean and in good condition until required for use.

Another object of the invention is to provide a jacket of this kind with ready means for conveniently loading the jacket with open-topped containers.

It is a further object to provide a jacket of the character described with an end sliding door for conveniently loading the jacket with an open-topped container of granulated material and with a pair of slidable closure plates covering fine and coarse openings in the top of the jacket.

For further comprehension of the invention, and of the object and advantages thereof, reference will be had to the following description and accompanying drawings, and to the appended claims in which the various novel features of the invention are more particularly set forth.

In the accompanying drawings forming a material part of this disclosure:

Fig. 3 is a front view of the jacket in closed position.

Fig. 4 is a plan sectional view taken on lines 4—4 of Fig. 3.

Fig. 5 is a front view of the jacket with slidable end panel removed.

Fig. 6 is a perspective view of a top closure plate.

Fig. 7 is a coss-sectional view of a portion of the jacket taken on lines 7—7 of Fig. 3.

Fig. 9 is a front view of a modified form of jacket with the slidable panel partly cut away.

Fig. 10 is a top view of the jacket of Fig. 9 with the slidable panel removed.

Fig. 11 is a perspective view of the slidable panel employed with the casing of Figs. 9 and 10.

Figure 1:
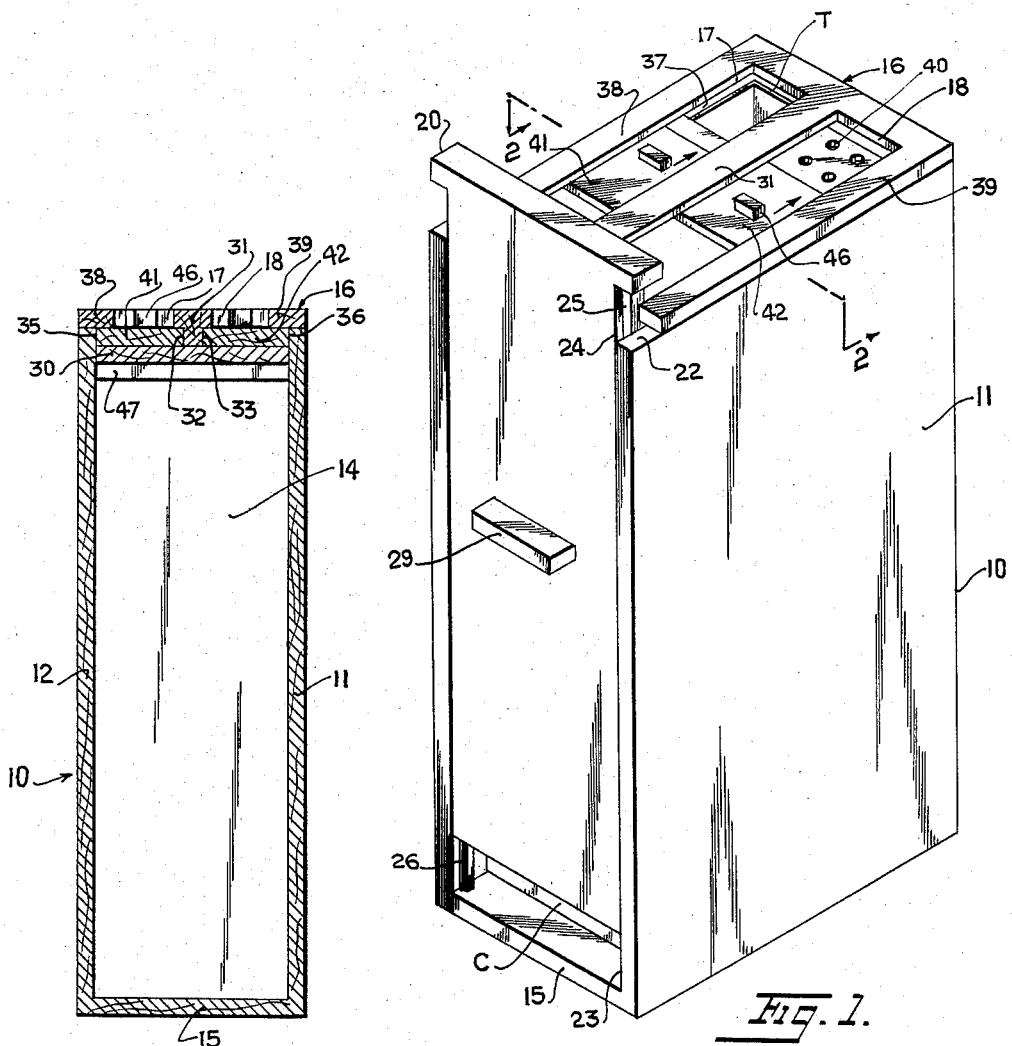
Fig. 1 is a perspective view of a storage and dispensing jacket embodying the invention with containers stored therein and with the front panel shown partly open.
Figure 2:
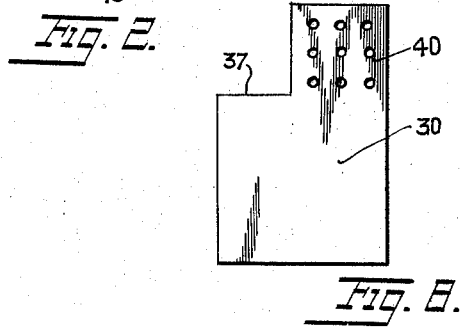
Fig. 2 is a longitudinal sectional view taken on lines 2—2 of Fig. 1.

Referring to Figs. 1–5 and 7 in the drawings, the jacket comprises a hollow casing 10 having broad rectangular side walls 11, 12, a closed rectangular rear end wall 14, and bottom 15. On the open top of the casing is mounted a generally E-shaped frame 16 which defines two rectangular openings 17 and 18 with the slidable rectangular panel 19. The panel 19 is a generally rectangular plate having a pair of laterally extending projections 20 which fit on the upper ends 22 of side walls 11 and 12. Panel 19 closes the open front end 23 of the casing. A pair of grooves 25 are formed in opposite long edges 24 of panel 19. Corresponding ridges 26 are formed on walls 11 and 12 near the open end of the casing. These ridges are engaged in the grooves 25 so that the panel 19 can be lifted up and off the casing if desired.

A container C of granulated material having an open top T may be inserted in the casing as shown in Fig. 1. The open top will be exposed at openings 17 and 18. Panel 19 has a projecting knob or handle 29 for convenience in lifting the panel.

Figure 8:
Fig. 8 is a plan view of a closure support plate employed in the jacket.

A rectangular plate 30 best shown in Fig. 8 having a rectangular opening or cut-out 37 is secured near the top of the casing. Plate 30 abuts the center arm 31 of frame 16. This arm is generally T-shaped in cross section to define parallel grooves 32 and 33 with plate 30. Lateral grooves 35 and 36 are also defined with plate 30 by the outer arms 38 and 39 of frame 16. A plurality of apertures 40 are formed in the end of plate 30 near end wall 14. A pair of rectangular closure plates 41, 42 slide in the several grooves 32, 35 and 33, 36.

Each of plates 41, 42 is formed as shown in Fig. 6. It has a rectangular body 45 with a projecting knob, handle or bar 46 centrally formed thereon and projecting from one side thereof.

A reinforcing crossbar 47 may be provided beneath plate 30 to support this plate. Bar 47 extends between side walls 11 and 12.

In operation of the device, container or box C having an open top is inserted through the open end 23 of the casing when panel 19 is raised or removed. Closing the panel 19 securely retains the box in casing 10 with the open top T of the box exposed at the opening 37 and apertures 40. When both plates 41, 42 are moved to close opening 37 and apertures 40 the contents of the box are effectively protected from ambient conditions of light, air, dust, etc.

Plates 41, 42 may be moved selectively to expose as much of opening 37 or apertures 40 as desired so that the granulated material in the box can be dispensed in fine or coarse streams as desired.

In Fig. 9, casing 10' is similar in structure to casing 10 except that the lateral ridges 26 are shortened to form the short projecting ridges 26' located near the top of the casing just in front of plate 30. The location of the ridges is clearly shown in Figs. 9 and 10. They permit the panel 19' shown in Fig. 11 to slide up and down between side walls 11 and 12. In the bottom plate 15 near the front thereof and coplanar with ridges 26' is a rectangular groove or slot 50. Panel 19' is provided with a depending tongue 51 which fits into the slot when the panel is fully closed. The use of the shortened ridges 26' effects an economy in construction and reduces frictional resistance in raising and lowering the panel. In addition the omission of the greater part of the lengths of the long ridges 26 permits the full width of the casing to be used for inserting a container therein. In the embodiment of the casing as shown in Figs. 1 and 5, the ridges 26 extend inwardly to obstruct somewhat the front opening of the casing. Thus the container is held rather loosely in the casing. In the embodiment of Figs. 9 and 10 the container can fit flush with walls 11 and 12 because of the foreshortened structure of the ridges 26'. When the panel 19' is closed, the engagement of the ridges 26' in grooves 25 at the sides of the panel together with the engagement of the tongue 51 in slot 50 securely retains the panel in the front opening of the casing.

The casing 10 and 10' may be made in whole or in part of wood, metal, plastic, fiberboard, or other suitable material. They may be readily fabricated by economical mass production methods. They are simple and durable in structure.

While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new, and desire to secure by United States Letters Patent is:

1. A jacket for a container of granulated material, comprising a hollow casing having an open top and end, closed rectangular side walls, a closed rectangular end wall and a closed rectangular bottom, a generally E-shaped frame mounted at the open top of the casing and supported on said side and end walls, said frame having lateral arms overhanging said side walls, and a central arm having a T-shaped cross section, a generally rectangular plate mounted in the casing and spaced from the top ends of the side walls to define lateral grooves with said lateral arms and central grooves with said central arm, a transversely disposed bar reinforcing and supporting said plate, said bar being mounted between said side walls, a pair of ridges formed on said side walls near the open end of the casing, said ridges being disposed in opposing parallel relationship to define a pair of tracks, a generally rectangular panel having longitudinal grooves in lateral ends thereof, slidably disposed at the open end of the casing with the longitudinal grooves engaging said ridges, and a pair of rectangular closure plates, one of each of said plates being slidably disposed between one of said lateral grooves and one of said central grooves, said plates being slidably disposed on said plate, said plate having a rectangular corner cut-out defining a rectangular opening with one of said side walls and said end wall, said plate having a plurality of apertures near said cut-out, said closure plates being selectively movable to uncover said rectangular opening and said apertures, each of the closure plates and said panel having projecting handles.

2. A jacket for a container of granulated material, comprising a hollow casing having an open top and end, closed rectangular side walls, a closed rectangular end wall and a closed rectangular bottom, a generally E-shaped frame mounted at the open top of the casing and supported on said side and end walls, said frame having lateral arms overhanging said side walls, and a central arm having a T-shaped cross section, a generally rectangular plate mounted in the casing and spaced from the top ends of the side walls to define lateral grooves with said lateral arms and central grooves with said central arm, a pair of ridges formed on said side walls near the open end of the casing, said ridges being disposed in opposing parallel relationship to define a pair of tracks, a generally rectangular panel having longitudinal grooves in lateral ends thereof, slidably disposed at the open end of the casing with the longitudinal grooves engaging said ridges, and a pair of rectangular closure plates, one of each of said plates being slidably disposed between one of said lateral grooves and one of said central grooves, said plates being slidably disposed on said plate, said plate having a rectangular corner cut-out defining a rectangular opening with one of said wide walls and said end wall, said plate having a plurality of apertures near said cut-out, said cut-out being so located that one of the closure plates covers said rectangular opening and the other of said closure plates covers said apertures when the closure plates are moved to abut the end wall, said closure plates being selectively movable to uncover said rectangular opening and said apertures.

3. A jacket for a container of granulated material, comprising a hollow casing having an open top and end, closed rectangular side walls, a closed rectangular end wall and a closed rectangular bottom, a generally E-shaped frame mounted at the open top of the casing and supported on said side and end walls, said frame having lateral arms overhanging said side walls and a central arm having a T-shaped cross section, a generally rectangular plate mounted in the casing and spaced from the top ends of the side walls to define lateral grooves with said lateral arms and central grooves with said central arm, a pair of ridges formed on said side walls near the open end of the casing, said ridges being disposed in opposing parallel relationship to define a pair of tracks, a generally rectangular panel having longitudinal grooves in lateral ends thereof slidably disposed at the open end of the casing with the longitudinal grooves engaging said ridges, and a pair of rectangular closure plates, one of each of said plates being slidably disposed between one of said lateral grooves and one of said central grooves, said plates being slidably disposed on said plate, said plate having a rectangular corner cut-out defining a rectangular opening with one of said side walls and said end wall, said plate having a plurality of apertures near said cutout, said cut-out being so located that one of the closure plates covers said rectangular opening and the other of said closure plates covers said apertures when the closure plates are moved to abut the end wall, said closure plates being selectively movable to uncover said rectangular opening and said apertures, whereby said container of granulated material may be placed in the casing with an open top of the casing located beneath said rectangular opening and said apertures and whereby movement of said closure plates dispenses said material from the casing in selective coarse and fine streams, said material being protected from ambient conditions of light, air, dust and vermin when the panel and said closure plates are fully closed, said ridges being short members located near the top of the casing, said bottom having a slot therein located substantially coplanar with said ridges, said panel having a depending tongue at the bottom thereof for engaging in the slot in the bottom of the casing when the panel is fully closed.

4. A jacket for a container of granulated material, comprising a hollow casing having an open top and end, closed rectangular side walls, a closed rectangular end wall and a closed rectangular bottom, a generally E-shaped frame mounted at the open top of the casing and supported on said side and end walls, said frame having lateral arms overhanging said side walls and a central arm having a T-shaped cross section, a generally rectangular plate mounted in the casing and spaced from the top ends of the side walls to define lateral grooves with said lateral arms and central grooves with said central arm, said central arm abutting said plate, a pair of ridges formed on said side walls near the open end of the casing, said ridges being disposed in opposing parallel relationship to define a pair of tracks, a generally rectangular panel having longitudinal grooves in lateral ends thereof, slidably disposed at the open end of the casing with the longitudinal grooves engaging said ridges, and a pair of rectangular closure plates, one of each of said plates being slidably disposed between one of said lateral grooves and one of said central grooves, said plates being slidably disposed on said plate, said plate having a rectangular corner cut-out defining a rectangular opening with one of said side walls and said end wall, said plate having a plurality of apertures near said cut-out, said cut-out being so located that one of the closure plates covers said rectangular opening and the other of said closure plates covers said apertures when the closure plates are moved to abut the end wall, said closure plates being selectively movable to uncover said rectangular opening and said apertures, whereby said container of granulated material may be placed in the casing with an open top of the casing located beneath said rectangular opening and said apertures and whereby movement of said closure plates dispenses said material from the casing in selective coarse and fine streams, said material being protected from ambient conditions of light, air, dust and vermin when the panel and said closure plates are fully closed.

5. A jacket for a container of granulated material, comprising a hollow casing having an open top and end, closed rectangular side walls, a closed rectangular end wall and a closed rectangular bottom, a generally E-shaped frame mounted at the open top of the casing and supported on said side and end walls, said frame having lateral arms overhanging said side walls and a central arm having a T-shaped cross section, a generally rectangular flat plate mounted in the casing and spaced from the top ends of the side walls to define lateral grooves with said lateral arms and central grooves with said central arm, said central arm abutting said plate, a transversely disposed bar reinforcing and supporting said plate, said bar being mounted between said side walls, a pair of ridges formed on said side walls near the open end of the casing, said ridges being disposed in opposing parallel relationship to define a pair of tracks, a generally rectangular panel having longitudinal grooves in lateral ends thereof slidably disposed at the open end of the casing with the longitudinal grooves engaging said ridges, and a pair of rectangular closure plates, one of each of said plates being slidably disposed between one of said lateral grooves and one of said central grooves, said plates being slidably disposed on said plate, said flat plate having a rectangular corner cut-out defining a rectangular opening with one of said side walls and said end wall, said plate having a plurality of apertures near said cut-out, said cut-out being so located that one of the closure plates covers said rectangular opening and the other of said closure plates covers said apertures when the closure plates are moved to abut the end wall, said closure plates being selectively movable to uncover said rectangular opening and said apertures, each of the closure plates and said panel having projecting handles, whereby said container of granulated material may be placed in the casing with an open top of the casing located beneath said rectangular opening and said apertures, and whereby movement of said closure plates dispenses said material from the casing in selective coarse and fine streams, said material being protected from ambient conditions of light, air, dust and vermin when the panel and said closure plates are fully closed.

6. A jacket for a container having an open top and being filled with granular material, comprising a hollow casing having an open top and front end, closed rectangular side walls, a closed rectangular rear end and a closed rectangular bottom, two parallel lateral outer arms and a central arm, the lateral arms being mounted at the open top of the casing and supported on said side walls, a plate mounted in the casing to define parallel grooves with said arms, said plate having a cut-out and a plurality of apertures spaced therefrom, a generally rectangular panel slidably disposed at the open end of the casing and a pair of closure plates slidably disposed between said plate and said arms to selectively cover said cut-out and said apertures, said bottom having a slot near the front end thereof, said panel having a depending tongue located to engage in said slot, and a pair of short ridges extending laterally from said side walls near said open end of the casing at the top thereof, said panel having lateral grooves engaging said short ridges.

References Cited in the file of this patent
UNITED STATES PATENTS

| | | |
|---|---|---|
| 1,134,540 | Kress | Apr. 6, 1915 |
| 2,000,818 | Bomberger | May 7, 1935 |
| 2,558,251 | Holsted | June 26, 1951 |